United States Patent Office 3,726,818
Patented Apr. 10, 1973

3,726,818
OXIDATIVE CURING RESIN COMPOSITION CONSISTING ESSENTIALLY OF AN OIL-MODIFIED ALKYD RESIN AND A POLYCYCLIC NAPHTHENIC HYDROCARBON COMPOUND
Satoru Enomoto, Hisayuki Wada, Mikio Fujioka, and Masao Koguro, Iwaki, Fukushima, Japan, assignors to Kureha Kagaku Kogyo Kabushiki Kaisha, Tokyo, Japan
No Drawing. Filed Nov. 20, 1970, Ser. No. 91,540
Claims priority, application Japan, Nov. 20, 1969, 44/92,650; May 18, 1970, 45/41,670
Int. Cl. C09d 3/64
U.S. Cl. 260—22 CQ                                    13 Claims

ABSTRACT OF THE DISCLOSURE

An oxidative curing resin composition containing an oil modified alkyd resin or drying oil and a polycyclic naphthenic hydrocarbon compound showing an average molecular weight of 200–1000 measured by the vapor pressure-osmotic method (hereinafter this method is called "VPO") and showing lower than 10% of an aromatic ring-forming proton density at a $\tau$ value of less than 4 by measurement of the nuclear magnetic resonance absorption spectrum (hereinafter, this measurement is called "NMR").

BACKGROUND OF THE INVENTION

Field of the invention

The present invention relates to an oxidative curing resin composition having increased water resistance.

Description of the prior art

Oxidative curing resins, such as various natural oils and fats, drying oils, synthetic drying oils, oil-modified alkyd resins, etc. are generally employed in various paints or coating materials and as sealants, since the resins are inexpensive and also excellent in working properties, may be rapidly cured, have good weathering resistance and adhesiveness. However, such resins have the disadvantage of being low in water resistance.

Various attempts have been made to obviate this drawback. For example, the water resistance of these resins may be improved by using a polycyclic aromatic compound, e.g. coal tar. However, in this case, the addition of the aromatic compound results in a bleeding phenomenon as a new fault. Furthermore, since the use of such polycyclic aromatic compounds is restricted to a narrow range from the point of view of color, such addition of a polycyclic aromatic compound has not yet generally been used for practical purposes.

Therefore, a primary object of the present invention is to provide a novel composition of an oxidative setting resin such as oil-modified alkyd resin or drying oil, which has a markedly improved water resistance without reducing the merits of the resin itself and without being accompanied by the occurrence of the bleeding phenomenon.

SUMMARY OF THE INVENTION

It has now been discovered that the above object of this invention may be attained by incorporating in an oxidative curing resin such as an oil-modified alkyd resin or drying oil polycyclic naphthenic hydrocarbon compound having an average molecular weight of from 200 to 1000 measured by the VPO method and showing an aromatic C-H proton density of 0.5–10% at a $\tau$ value of less than 4 measured by NMR.

DESCRIPTION OF THE PREFERRED EMBODIMENTS

It is difficult to clearly explain why the vehicle of this invention, which is the polycyclic naphthenic hydrocarbon mixture, can markedly improve the water resistance of an oxidative curing resin as the above mentioned oil-modified alkyd resin or drying oil, but this will be discussed below. From the fact that when the vehicle of this invention is allowed to stand for a long period of time or is mixed with a curing agent such as cobalt naphthenate, etc., the vehicle is cured or hardened, it is supposed that some reaction takes place. The reaction of a resin having a double bond and a curing agent is generally explained by the reaction mechanism that the allyl position having a high radical reactivity is oxidized to cause cross-linking, whereby the coating of the resin is cured. However, the reaction mechanism caused by the additive of this invention is considered to be different from the above-mentioned reaction mechanism. This can be confirmed by the fact that the iodine value of the above-mentioned unsaturated resin is higher than 150, whereas that of the product of this invention is less than 10.

As will be stated below, the vehicle of this invention is prepared by nucleus-hydrogenating a polycyclic aromatic hydrocarbon compound. In general, it is very difficult to completely nucleus-hydrogenate a polycyclic aromatic compound. Accordingly, although the vehicle of this invention obtained by nucleus-hydrogenating a polycyclic aromatic hydrocarbon compound consists essentially of polycyclic naphthenic hydrocarbons, the product has not completely been nucleus-hydrogenated, considering that even if the aromatic proton density measured by NMR is very low (such as less than 10%), there remains an absorption of aromatics by an Ultraviolet absorption analysis. That is, in for example, the anthracene derivative shown in the following formula, an aromatic having a small number of substituents is readily nucleus-hydrogenated, but the inner aromatic ring having substituents is apt to be left in an unhydrogenated state;

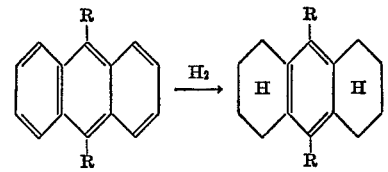

Thus, the above-mentioned compound has a large number of protons at the benzyl position which is liable to cause radical reaction in the molecule and hence it can be anticipated that if the above compound is blended with a naphthenate of cobalt, manganese or lead and the blend is coated, a curing reaction occurs by the oxidation of the benzyl position. That is, it is thought that the excellent advantages achieved utilizing the additive of this invention are due to the fact that the water resistance is improved by the addition of the naphthenic hydrocarbons, and also the occurrence of the bleeding phenomenon is prevented by the oxidative curing of the allyl position of the resin and also the oxidative curing of the benzyl position of the vehicle. However, this explanation has not as yet been confirmed.

The general properties of the vehicle of this invention, which give the excellent results as mentioned above, are as follows:

TABLE 1

| | |
|---|---|
| Boiling point range (° C.) | Higher than 250 |
| Average molecular weight (VPO) | 200–1000 |
| Gardner color number | 1–14 |
| Aromatic C-H proton density at a $\tau$ value of less than 4 measured by NMR (percent) | 0.5–10 |
| Specific gravity ($d_4^{20}$) | 0.92–1.05 |
| H/C by elementary analysis | 1.40–1.80 |
| S, N, and O by elementary analysis (wt. percent) | 0 |

The vehicle of this invention shows excellent characteristics in the case of blending and curing an oil-modified alkyd resin or drying oil composition. Among these vehicles, those fractions having boiling points lower than 350° C. are effective when used with a natural drying oil and a synthetic drying oil; and those containing fractions having boiling points of from 250 to 350° C. are especially preferably for use as a solvent-less paint by blending with alkyd resins.

The polycyclic naphthenic hydrocarbon mixture to be used as a vehicle in the present invention may be readily prepared by nucleus-hydrogenating polycyclic aromatic compounds each having more than 2 aromatic rings by an ordinary manner using an ordinary apparatus and catalyst and then removing low boiling fractions having boiling points lower than 250° C. from the reaction product. The polycyclic aromatic compounds used as the starting materials in the above reaction are residual oils obtained during the production of olefins by treating petroleum hydrocarbons or fractions thereof such as crude oil, heavy oil, light oil, kerosene, and naphtha at high temperatures, or coal tars obtained during the gasification of coal by dry distillation. As the residual oils, there may be illustrated the residual oils obtained from the production of acetylene and ethylene, the bottom oils obtained from the production of ethylene, by the thermal cracking of naphtha, oil tars obtained from the production of city gases, coking residual oil, vis-breaking residual oil, catalytic cracking cycle oil, dealkylation residual oils, etc. The residual oils which have been subjected to heat treatment at temperatures higher than 700° C. are particularly preferable.

The polycyclic aromatic compounds to be used in this invention may be alkylated, if necessary, with lower olefins having less than 8 carbon atoms, such as ethylene, propylene, butylene, etc., and by using an ordinary apparatus and catalyst by conventional methods. Also, it is particularly preferable to remove impurities from the polycyclic aromatic compounds by subjecting the aromatic compounds to desulfurization by a conventional method using an ordinary apparatus and catalyst in order to improve the life of the alkylation catalyst and allow the nucleus hydrogenation reaction to be performed smoothly.

The desulfurization may be conducted in a conventional manner using a known desulfurization means. The catalyst to be employed in the desulfurization involves cobalt, molybdenum, or nickel in the form of metal per se, their oxides, sulfides, or combinations thereof, which may be supported by suitable carriers such as alumina or silica-alumina. The desulfurization reaction is carried out at a temperature of 350–450° C. under a pressure of 20–100 kg./cm.² using a feeding ratio (molar ratio of hydrogen to tar fraction) of 3–20 moles/mole, at a liquid hourly space velocity of 0.5–10 ml./ml.-cat./hr. (L.H.S.V.). Under such conditions, the reaction takes place readily and removes the sulfur contained in the tar fractions.

The ensuing alkylation reaction is conducted by mixing gaseous olefins with the desulfurized tar fractions and reacting them in the presence of a suitable acidic catalyst. The acidic catalyst to be employed preferably includes a silica-alumina type catalyst or a metal belonging to Group III–B of the Periodic Table, such as lanthanum, cerium, thorium, etc., supported by a proper carrier such as zeolite.

The feed olefin to be used is preferably a lower olefin generally having not more than 8 carbon atoms, preferably 2–4 carbon atoms. Typical olefins to be used are ethylene, propylene, butylene, etc., and the use of such olefins is economically advantageous. The reaction conditions to be employed are generally a temperature between 150° C. and 380° C., a pressure between 1 and 50 kg./cm.², a feeding ratio between 0.2 and 10 moles of olefin per mole of the tar fraction and a liquid hourly space velocity of from 0.1 to 50 cc./cc.-catalyst/hr.

The reaction takes place readily with the use of the catalyst and may be conducted over a prolonged period of time without decreasing the activity of the catalyst.

Since the tar fraction has very few side chains, an alkyl side chain may be added under desired controls. The length of the alkyl group to be added depends upon the kind of olefin to be use and the degree of alkylation (the number of moles of the olefin to be reacted per mole of the tar fraction) can be increased by employing a high feed ratio or by employing a small liquid hourly space velocity. The alkylated tar thus formed has a lower specific gravity, a lower refractive index as well as a higher H/C ratio, a higher viscosity, a larger mean molecular weight and a higher boiling point than the feed tar fraction. By analysis of the alkylated product using gas chromatography, infrared absorption spectrum, nuclear magnetic resonance absorption spectrum, etc., the alkylated tar is estimated to have a chemical structure consisting of condensed polycyclic aromatic rings having from two to five, preferably from two to four, aromatic rings which are combined with the added alkyl group containing the same carbon number as the olefin used in the alkylation reaction.

The subsequent hydrogenation reaction is carried out by admixing the alkylated tar with hydrogen and reacting them in the presence of a suitable catalyst. The catalyst to be used in the hydrogenation process includes the metals belonging to Groups VI, VII and VIII, and oxides and sulfides thereof, and combinations thereof. These components may be supported on carriers such as diatomaceous earth, alumina, bauxite, pumice stone, silica-alumina, activated carbon, etc. Typical examples of these catalysts are nickel-carrying diatomaceous earth, molybdenum-carrying alumina, platinum-carrying alumina, cobalt-carrying alumina, etc. The reaction is generally carried out under conditions of a temperature of 100–450° C., a pressure of 10–300 kg./cm.², 5–30 moles of hydrogen per mole of alkylated tar in the feed, and a liquid hourly space velocity of 0.5–10 cc./cc.-catalyst/hr.

The reaction in this step involves mainly the hydrogenation of the polycyclic aromatic compounds without being accompanied by side reactions such as dissociation of the alkyl side chain, ring opening of the naphthene rings, decomposition, polymerization, etc., thus forming alkylated polycyclic naphthene compounds in good yield. By removing fractions having boiling points of lower than 250° C. the vehicle of this invention can be obtained.

The oxidative curing resin to be employed in the present invention includes natural drying oils such as castor oil, coconut oil, linseed oil, tung oil, and soybean oil; synthetic drying oils such as dehydrated castor oil, maleic acid modified oil, styrenated oil, etc.; oil-modified alkyd resin; fat-modified liquid epoxy resins.

Whenan oil-modified alkyd resin which can be set at normal temperatures and which has been prepared from a saturated or unsaturated polybasic acid and a polyhydric alcohol and a drying oil or a semidrying oil, is used as a paint, the use of a solvent is necessary from the point of view of the working property of the paint, and also, the properties of the coating thus formed from the paint are inferior in water resistance and weathering resistance. On the other hand, by adding the polycyclic naphthenic hydrocarbon compounds of this invention to the above-mentioned resin as a vehicle, the resin can be used as a solventless paint and the water resistance is remarkably improved. The vehicle of this invention has a good compatibility with the above alkyd resin and also increases the hardness of the resin coating.

The saturated or unsaturated polybasic acid employed in the forming of the oil-modified alkyd resin includes phthalic anhydride, maleic anhydride, isophthalic acid, fumaric acid, azelaic acid, succinic acid, adipic acid, and sebatic acid. The polyhydric alcohols may be, for example, glycerin, pentaerythritol, dipentaerythritol, trimethylol propane, sorbitol, ethylene glycol, and propylene glycol. Furthermore, as the drying oil or semidrying oil, there may be illustrated linseed oil, tung oil, safflower oil, soybean oil, (perilla oil), hemp seed oil, cotton seed oil, sesame oil, and dehydrated castor oil.

When the aforesaid normal temperature drying oil or curing-type alkyd resin is used, the amount of the vehicle in the composition of this invention is 5–1000 parts, preferably 20–200 parts, by weight, based on 100 parts by weight of said resin. If the amount of vehicle is less than 5 parts by weight, the water resistance of the alkyd resin will be insufficiently improved, while if the amount of the vehicle is larger than 1000 parts by weight, the characteristics specific to the alkyd resin will become insufficient. In general, the most preferable amount of the vehicle is 50–150 parts by weight.

Furthermore, it is suitable to add to the composition of naphthenate or an octoate of cobalt, manganese, lead, calcium, zinc, or iron or a mixture thereof, in an amount of 0.01–3 parts by weight.

The composition of this invention may be diluted for use with thinners such as aromatic compounds, e.g. benzene, toluene, xylene, and the like; mineral oils, e.g., petroleum ether, benzine, kerosene, etc.; ketones, e.g. acetone, methyl ethyl ketone; and esters, e.g., ethyl acetate, butyl acetate and the like. Also, the composition of this invention may further be denatured by additives such as a curing agent, a coloring agent, a filler, a plasticizer and an antioxidant without adversely affecting the composition.

The resin composition of this invention can be suitably used in any field in which an oxidative curing resin has been used and in particular, since the resin composition of this invention has improved water resistance, the utility of the composition is expanded. The resin composition of this invention is particularly suitable in various paints or coating materals and as a sealant material.

Several examples of methods of preparation of the compositions of this invention are given below.

PREPARATION EXAMPLE 1

From the oily materials obtained by thermally cracking ceria crude oil by spraying the crude oil into high temperature steam of 1900° C. were recovered the fractions having boiling points higher than 250° C. The recovered fractions were passed through a reaction tube filled with a cobalt-molybdenum-alumina type desulfurization catalyst at a pressure of 50 kg./cm.$^2$, a temperature of 400° C., a liquid hourly space velocity of 0.5, and a mole ratio of hydrogen/fractions of 5, whereby impurities such as sulfur were removed. Then, the desulfurized fractions were mixed with 10 volumes of hydrogen for each unit volume of fractions and the mixture was introduced into a reaction tube packed with a nickel-diatomaceous earth type hydrogenation catalyst to nucleus-hydrogenate the fractions at a pressure of 100 kg./cm.$^2$, a liquid hourly space velocity of 0.5, and a temperature of 200° C. Thereafter, the reaction product was distilled to remove volatile matters having boiling points of lower than 260° C. and 400° C. to provide vehicle fractions A and B. The properties of vehicles A and B are shown in Table 2.

TABLE 2

| Vehicle | A | B | C | D |
|---|---|---|---|---|
| Boiling point (° C.) | 260–400 | >500 | 260–350 | 350–500 |
| Specific gravity ($D_4^{20}$) | 0.99 | 0.97 | 1.00 | 0.93 |
| Viscosity (cp.) (20° C.) | | 450,000 | | 35,000 |
| Refractive Index ($M_D^{20}$) | 1.53 | | 1.53 | |
| Aromatic ring forming proton density NMR (percent) | 4 | 5 | 1 | 1 |
| Average molecular weight | 300 | 620 | 250 | 400 |
| Gardner color No. | 2 | 14 | 2 | 2 |
| H/C by elementary analysis | 1.71 | 1.43 | 1.78 | 1.78 |
| N, S, O (wt. percent) | 0 | 0 | 0 | 0 |

PREPARATION EXAMPLE 2

The oily materials prepared by the thermal cracking and then desulfurizing of Example 1 were mixed with propylene at a propylene/oil material mole ratio of 5 and the mixture was then introduced into a reaction tube packed with silica-alumina catalyst at a pressure of 5 kg./cm.$^2$, a liquid hourly space velocity of 0.5 and a temperature of 200° C. to conduct the propylation. Then, the product was subjected to nucleus hydrogenation by the same manner as in Example 1. By removing volatile matters having boiling points lower than 270° C. and 350° C. from the oily material thus obtained by distillation, and collecting the fractions having boiling points up to 500° C., vehicle fractions C and D of this invention were obtained. The properties of vehicles C and D are shown in Table 2.

PREPARATION EXAMPLE 3

The fractions obtained by removing volatile matters having boiling points of lower than 250° C. from the bottom oil formed during the production of ethylene by the outer-heating type steam cracking of naphtha were subjected to desulfurization and nucleus hydrogenation under the conditions shown in Table 3 and the reaction product was distilled to remove volatile matters have boiling points of lower than 280° C., 350° C. and 400° C. The properties of the vehicle fractions E, F and G thus obtained are shown in Table 4.

TABLE 3

| Catalyst | Temp. (° C.) | Pressure (kg./cm.$^2$) | (A) | (B) | (C) |
|---|---|---|---|---|---|
| Desulfurization | Co-Mo-alumina. | 400 | 40 | 2.5 | 0.5 | |
| E, F hydrogenation | Ni-diatomaceous earth. | 250 | 100 | 10.0 | 0.6 | 80 |
| G hydrogenation | do | 250 | 100 | 10.0 | 0.8 | 70 |

NOTE.—(A) Mole ratio of hydrogen to tar; (B) Space velocity; (C) Degree of hydrogenation.

TABLE 4

| Vehicle | E | F | G |
|---|---|---|---|
| Boiling point (° C.) | >400 | 280–350 | 280–350 |
| Specific gravity ($d_4^{20}$) | 0.95 | 1.00 | 1.02 |
| Viscosity (cp.) (20° C.) | 370,000 | | |
| Refractive Index ($n_D^{20}$) | | 1.53 | 1.55 |
| Aromatic ring forming proton density (NMR percent) | 3 | 5 | 7 |
| Average molecular weight | 500 | 250 | 250 |
| Gardner color No. | 10 | 2 | 2 |
| H/C by elementary analysis | 1.55 | 1.80 | 1.72 |
| N, S, O (wt. percent) | 0 | 0 | 0 |

PREPARATION EXAMPLE 4

The tarry materials by-produced during the production of acetylene and ethylene by introducing a North Sumatra crude oil into super-heated steam of 2300° C. and heat-treating the oil for 0.003 second at 1,350° C. were subject to desulfurization, alkylation with propylene, and hydrogenation under the conditions shown in Table 5 and thereafter the product was distilled and purified to provide vehicles H, I and J of this invention. The difference in conditions for producing the vehicles H, I and J is the difference in the degree of ring hydrogenation by the extent of the hydrogenation conditions as shown in Table 5. The hydrogenation reactions were carried out so that the degree of hydrogenation was 90% for vehicles H and J, and 70% for vehicle I. The properties of vehicles H, I and J are shown in Table 6.

TABLE 5

| Process: | Catalyst | Temp. (° C.) | Pressure (kg./cm.²) | (A)[1] | (A)[2] | (B)[3] | (C)[4] (percent) |
|---|---|---|---|---|---|---|---|
| Desulfurization | Co-Mo-alumina | 350 | 35 | 5.0 | | 0.5 | |
| Propylation | Silica-alumina | 200 | 20 | | 3.0 | 0.5 | |
| H, J hydrogenation | Ni-diatomaceous earth | 250 | 100 | 10.0 | | 0.5 | 90 |
| I hydrogenation | do | 250 | 100 | 10.0 | | 0.8 | 70 |

[1] Mole ratio of hydrogen to feed.
[2] Mole ratio of propylene to feed.
[3] Liquid hourly space velocity.
[4] Degree of hydrogenation.

TABLE 6

| Vehicle | H | I | J |
|---|---|---|---|
| Boiling point (° C.) | 280–350 | 280–350 | 280–500 |
| Specific gravity ($d_4^{20}$) | 0.99 | 0.99 | 1.00 |
| Viscosity (cp.) (at 20° C.) | | | 22,500 |
| Refractive Index ($n_D^{20}$) | 1.53 | 1.54 | |
| Aromatic ring forming proton density (NMR) (percent) | 3 | 7 | 3 |
| Average molecular weight | 300 | 290 | 400 |
| Gardner color No. | 2 | 2 | 4 |
| H/C by elementary analysis | 1.73 | 1.65 | 1.76 |
| Hydrogenation degree | 90 | 70 | 90 |
| N, S and O (wt. percent) | 0 | 0 | 0 |

The following examples are given in order to further illustrate the subject of the present invention.

EXAMPLE 1

In this example, an alkyd resin was blended with vehicles A and B (described above) and the blends were used as a coating material.

COMPOSITION

Parts by wt.
Alkyd resin (Phthalkyd 265–100 phthalic anhydride 24%, soybean oil modified, oil length 65%, trade name, made by Hitachi Kasei K.K.) _____ 200
Cobalt naphthenate _____ 0.5
Thinner _____ 100
Vehicle (A, B).[1]

[1] Shown in Table 7.

The above mixtures were coated to a thickness of 30–50 microns and the time necessary for the coatings to become set (to touch) at 20° C. was measured.

After drying the coated film at normal temperatures for 7 days, a boiling water test (immersed in boiling water for 1 hour), a light resistance test (exposed for 200 hours by means of a Fade-Ometer), a bending test (⅛ inch, mandrel test), and an adherence test were performed on the coatings, the results of which are shown in Table 7. The results showed that the coated film obtained from the composition of this invention possessed excellent properties.

TABLE 7

| Vehicle, (parts by weight) | Setting time | Boiling water test | Light resistance test | Bending test | Adherence test |
|---|---|---|---|---|---|
| Blank | 10 | Swelled after 3 min. | Unchanged | Passed | Passed. |
| A(50) | 10 | Swelled after 45 min. | do | do | Do. |
| A(100) | 11 | Unchanged after 60 min. | do | do | Do. |
| A(200) | 12 | do | do | do | Do. |
| B(10) | 10 | Unchanged after 20 min. | do | do | Do. |
| B(50) | 10 | Unchanged after 30 min. | do | do | Do. |
| B(100) | 12 | Unchanged after 60 min. | do | do | Do. |
| B(200) | 12 | do | do | do | Do. |
| B(300) | 12 | do | do | do | Do. |
| B(500) | 15 | do | do | do | Do. |
| B(1,000) | 20 | do | do | do | Do. |

EXAMPLE 2

To a mixture of 100 parts by weight of a boiled oil and 0.1 part by weight of cobalt naphthenate were added 400 parts by weight of vehicles C and D of this invention and 150 parts by weight of red lead. By using the resulting mixture, a coated film was prepared as in Example 1 and after being allowed to stand for 7 days, the boiling water test, the light resistance test, the bending test and the adherence test as in Example 1 were conducted.

A blank sample was easily swelled by water within 5 minutes, but no water swelling was observed for 60 minutes in the boiling water test in the case of the sample containing the vehicle of this invention. No change was observed during the light resistance test in the case of the sample containing the vehicle of this invention.

EXAMPLE 3

The coating composition containing vehicle D in Example 2 was applied as an undercoating and a mixture of 100 parts by weight of an alkyd resin, 100 parts by weight of vehicles E, F and G and 10 parts by weight of titanium white as a coloring matter was coated onto the undercoating. The same tests as in Example I were conducted on the films thus coated. In a blank test in which vehicle B of the present invention was not used, the overcoat was stripped after 5 minutes in the boiling water test, while the overcoat containing vehicles E, F and G of the present invention was stable even after 60 minutes in the boiling water.

Also, in the light resistance test, no change was observed in the overcoat containing vehicles E, F and G, whereas the overcoat not containing the vehicle of this invention was discolored, which shows the excellency of the composition of this invention.

EXAMPLE 4

A 1:1 mixture of each of the vehicles H, I and J and a long oil alkyd resin (Beckosol P470-70, trade name, made by Nippon Reichhold Co., soybean oil-modified oil length 65%, phthalic acid 25%, from which solvent had been removed) was mixed with 0.2% cobalt naphthenate as a curing agent and the mixtures were coated onto a support.

After 7 days, various tests were conducted on the coated films and the results are shown in Table 8. In addition, a blank test was conducted by using only the aforesaid long oil alkyd resin and the results are also shown in Table 8 for comparison.

TABLE 8

| | Setting time (hr.) | Adhesion test | Mandrel test | Erichsen test | Impact strength | Pencil hardness | Boiling water resistance |
|---|---|---|---|---|---|---|---|
| Blank | 3 | 100/100 (OK)g. | 2 mm. (OK)g. | 10.40 mm. | 1 kg.-50 cm. (OK) | 2H | Stripped after 10-20 min. |
| H | 3 | 100/100 (OK)g. | 2 mm. (OK)g. | 911.30 mm. | 1 kg.-50 cm. (OK) | 3H-4H | Unchanged after 60 min. |
| I | 3 | 100/100 (OK)g. | 2 mm. (OK)g. | 10.95 mm. | 1 kg.-50 cm. (OK) | 3H | Do. |
| J | 3 | 100/100 (OK)g. | 2 mm. (OK) | 11.50 mm. | 1 kg.-50 cm. (OK) | 3H-4H | Do. |

Also, the same tests as above were repeated with these samples after exposing them for 200 hours by means of a fade-o-meter and the results are shown in Table 9.

TABLE 9

| | Adhesion test | Mandrel test | Erichsen test | Impact strength | Pencil hardness | Boiling water resistance |
|---|---|---|---|---|---|---|
| Blank | 100/100 (OK) | 2 mm. (OK) | 10.00 mm. (OK) | 1 kg.-40 cm. (OK) | 2H | Stripped after 5 min. |
| H | 100/100 (OK) | 2 mm. (OK) | 11.00 mm. | 1 kg.-50 cm. (OK) | 4H-5H | Unchanged after 60 min. |
| I | 100/100 (OK) | 2 mm. (OK) | 10.65 mm. | 1 kg.-50 cm. (OK) | 5H | Do. |
| J | 100/100 (OK) | 2 mm. (OK) | 11.40 mm. | 1 kg.-50 cm. (OK) | 4H-5H | Do. |

As is clear from Table 8 and Table 9 shown above, the composition of this invention had coating properties as good as the ordinary alkyd resin paint and was remarkably excellent in hardness, water resistance, light resistance, and weathering resistance as compared with the ordinary alkyd resin paint.

EXAMPLE 5

A 1:1 mixture of each of the vehicles A, B, C, D, E, F and G of this invention and an alkyd resin (Phthalkyd 365-65, trade name, made by Hitachi Kasei K.K., a linseed oil-denatured resin containing 24% phthalic acid) was mixed with 0.2% cobalt naphthenate as a curing agent and the resultant mixtures were coated on a support. After 7 days, the properties of the coating were measured, the results of which are shown in Table 10.

TABLE 10

| | Adhesion test | Mandrel test | Erichsen test | Impact strength | Pencil hardness | Boiling water resistance |
|---|---|---|---|---|---|---|
| Blank | 100/100 (OK) | 2 mm. (OK) | 10.00 mm. | 1 kg.-50 cm. (OK) | 2H | Stripped after 15 min. |
| A | 100/100 (OK) | 2 mm. (OK) | 11.30 mm. | 1 kg.-50 cm. (OK) | 3H | Unchanged after 60 min. |
| B | 100/100 (OK) | 2 mm. (OK) | 10.80 mm. | 1 kg.-50 cm. (OK) | 3H-4H | Do. |
| C | 100/100 (OK) | 2 mm. (OK) | 10.90 mm. | 1 kg.-50 cm. (OK) | 3H | Do. |
| D | 100/100 (OK) | 2 mm. (OK) | 10.90 mm. | 1 kg.-50 cm. (OK) | 3H-4H | Do. |
| F | 100/100 (OK) | 2 mm. (OK) | 11.20 mm. | 1 kg.-50 cm. (OK) | 3H-4H | Do. |
| G | 100/100 (OK) | 2 mm. (OK) | 10.00 mm. | 1 kg.-50 cm. (OK) | 3H | Do. |

Thereafter, the same tests as above were repeated on these coatings after exposing them for 200 hours by means of a Fade-O-Meter. The results are shown in Table 11.

TABLE 11

| | Adhesion test | Mandrel test | Erichsen test | Impact strength | Pencil hardness | Boiling water resistance |
|---|---|---|---|---|---|---|
| Blank | 100/100 (OK) | 2 mm. (OK) | 99.0 mm. | 1 kg.-40 cm. (OK) | 2H | Stripped after 5 min. |
| A | 100/100 (OK) | 2 mm. (OK) | 11.10 mm. | 1 kg.-50 cm. (OK) | 4H | Unchanged after 60 min. |
| B | 100/100 (OK) | 2 mm. (OK) | 10.60 mm. | 1 kg.-50 cm. (OK) | 4H-5H | Do. |
| C | 100/100 (OK) | 2 mm. (OK) | 10.80 mm. | 1 kg.-50 cm. (OK) | 4H | Do. |
| D | 100/100 (OK) | 2 mm. (OK) | 10.70 mm. | 1 kg.-50 cm. (OK) | 5H | Do. |
| F | 100/100 (OK) | 2 mm. (OK) | 10.10 mm. | 1 kg.-50 cm. (OK) | 5-6H | Do. |
| G | 100/100 (OK) | 2 mm. (OK) | 10.50 mm. | 1 kg.-50 cm. (OK) | 5H | Do. |

As is clear from Table 10 and Table 11, the composition of this invention had coating properties as good as those of the ordinary alkyd resin paint and also was very excellent in hardness, water resistance, weathering resistance and light resistance as compared with the ordinary alkyd resin paint.

It should be understood that the use of the terminology "oxidative" is meant to be synonymous with "air." In other words, the curing resin used in the present composition is one which is cured by standing in air as is common in the art.

What is claimed is:

1. A resin composition consisting essentially of 100 parts of an oil-modified alkyd resin and 5 to 1,000 parts of a polycyclic naphthenic hydrocarbon compound having an average molecular weight of from 200 to 1,000 measured by the vapor pressure osmotic method and showing less than 10% of an aromatic proton density at a $\tau$ value of less than 4 measured by a nuclear magnetic resonance method, a boiling point of higher than 250° C., a Gardner color number of from 1 to 14, a specific gravity of from 0.92 to 1.05, a H/C ratio by elementary analysis of from 1.40 to 1.80, and a sulphur, nitrogen and oxygen content by elementary analysis of zero said polycyclic naphthenic hydrocarbon compound being prepared by nucleus-hydrogenating a polycyclic aromatic hydrocarbon compound to the extent that said compound is only partially nucleus-hydrogenated, and said polycyclic naphthenic hydrocarbon compound serving to chemically affect said resin composition to the extent that such composition will exhibit excellent water resistance and bleeding resistance.

2. The resin composition as claimed in claim 1 wherein said polycyclic naphthenic hydrocarbon compound is prepared by nucleus-hydrogenating polycyclic aromatic compound having more than 2 aromatic rings and removing from the resulting product low boiling fractions having boiling points of lower than 250° C. calculated at normal pressure.

3. The resin composition as claimed in claim 2 wherein prior to the nucleus hydrogenation, the polycyclic aromatic compound having more than 2 aromatic rings is alkylated by an olefin having less than 4 carbon atoms.

4. The resin composition according to claim 3 wherein said polycyclic aromatic compound is alkylated by an olefin having no more than 8 carbon atoms under the following conditions:

a temperature between 150 to 380° C.;
a pressure between 1 and 50 kg./cm.²;
a feeding ratio between 0.2 and 10 moles of olefin per mole of the tar fraction; and
a liquid having a space velocity of from 0.1 to 50 cc./cc.-catalyst/hr.

5. The resin composition of claim 4, wherein said olefin has a carbon range of from 2 to 4 carbon atoms.

6. The resin composition as claimed in claim 1 wherein the amount of the polycyclic naphthenic hydrocarbon compound is from 20 to 200 parts by weight based on 100 parts by weight of said group member.

7. The resin composition as claimed in claim 6 wherein the amount of the polycyclic naphthenic hydrocarbon compound is from 50 to 150 parts by weight, based on 100 parts by weight of the alkyd resin.

8. The resin composition as claimed in claim 1 wherein said polycyclic aromatic hydrocarbon compound is a residual oil obtained during the production of olefins by treating the petroleum hydrocarbons or fractions thereof.

9. The resin composition as claimed in claim 8 wherein said residual oil is selected from the group consisting of residual oils obtained from the production of acetylene and ethylene, the bottom oils obtained from the production of ethylene, one obtained by the thermal cracking of naphtha, an oil tar obtained from the production of city gases, coking residual oil, vis-breaking residual oil, catalytic cracking cycle oil, and dealkylation residual oils.

10. The residual oil according to claim 8 wherein said residual oil has been subjected to heat treatment at temperatures greater than 700° C.

11. The resin composition as claimed in claim 1 wherein said alkyd resin is a normal temperature curing alkyd resin prepared from an unsaturated or saturated polybasic acid, a polyhydric alcohol, and a drying oil or a semidrying oil.

12. The resin composition according to claim 1 wherein said oil-modified alkyd resin is prepared from a polybasic acid selected from the group consisting of phthalic anhydride, maleic anhydride, isophthalic acid, fumaric acid, azelaic acid, succinic acid, adipic acid, and sebatic acid and a polyhydric alcohol selected from the group consisting of glycerine, pentaerythritol, dipentaerythritol, trimethylol propane, sorbitol, ethylene glycol, and propylene glycol.

13. A resin composition consisting essentially of 100 parts of an oil-modified alkyd resin, 5 to 1,000 parts of a polycyclic naphthenic hydrocarbon compound having an average molecular weight of from 200 to 1,000 measured by the vapor pressure osmotic method and showing less than 10% of an aromatic proton density at a $\tau$ value of less than 4 measured by a nuclear magnetic resonance method, a boiling point of higher than 250° C., a Gardner color number of from 1 to 14, a specific gravity of from 0.92 to 1.05, a H/C ratio by elementary analysis of from 1.40 to 1.80, and a sulphur, nitrogen and oxygen content by elementary analysis of zero and 0.01 to 3% by weight of a curing agent selected from the group consisting of a naphthenate or an octoate of cobalt, manganese, lead, calcium, zinc, iron and mixtures thereof, said polycyclic naphthenic hydrocarbon being prepared by nucleus-hydrogenating a polycyclic aromatic hydrocarbon compound to the extent that said compound is only partially nucleus-hydrogenated, and said polycyclic naphthenic hydrocarbon compound serving to chemically affect said resin composition to the extent that such composition will exhibit excellent water resistance and bleeding resistance.

References Cited

UNITED STATES PATENTS

| | | | |
|---|---|---|---|
| 3,553,124 | 1/1971 | Donatello et al. | 260—23 |
| 3,514,395 | 5/1970 | McVay et al. | 260—33.6 |
| 3,555,113 | 1/1971 | Sattler | 260—33.6 |
| 3,549,571 | 12/1970 | Berg et al. | 260—33.6 |
| 3,446,763 | 5/1969 | Okuzumi | 260—22 |
| 2,480,268 | 8/1949 | Ipatieff et al. | 260—668 |
| 3,317,623 | 5/1967 | Green et al. | 260—668 |
| 3,449,452 | 6/1969 | Gatsis et al. | 260—668 |
| 3,549,361 | 12/1970 | Miller | 260—668 |

DONALD E. CZAJA, Primary Examiner

R. W. GRIFFIN, Assistant Examiner

U.S. Cl. X.R.

106—265; 117—161 K, 161 F; 260—18 EP, 22 A, 33.6 R